United States Patent [19]

Wolters

[11] Patent Number: 5,322,174

[45] Date of Patent: Jun. 21, 1994

[54] RESILIENT MONOLITHIC WORKSURFACE

[75] Inventor: Richard H. Wolters, Grand Rapids, Mich.

[73] Assignee: Haworth, Inc., Holland, Mich.

[21] Appl. No.: 2,629

[22] Filed: Dec. 11, 1992

Related U.S. Application Data

[63] Continuation of PCT/US91/04383, Jun. 19, 1991, which is a continuation of Ser. No. 540,156, Jun. 19, 1990, abandoned.

[51] Int. Cl.$^5$ .............................................. A47F 7/00
[52] U.S. Cl. ...................................... 211/153; 428/68
[58] Field of Search ................. 211/153, 134, 135, 90, 211/87; 108/901; 428/68, 76, 71

[56] References Cited

U.S. PATENT DOCUMENTS 3,771,466 11/1973 Ferdinand et al. .
4,240,557 12/1980 Dickens .
4,308,963 1/1982 Worrallo .
4,393,104 7/1983 Fink .
4,623,571 11/1986 Yamamoto et al. .
4,740,042 4/1988 Stich et al. .
4,753,836 6/1988 Mizell .
4,794,027 12/1988 Hering .

Primary Examiner—Robert W. Gibson, Jr.
Attorney, Agent, or Firm—Flynn, Thiel, Boutell & Tanis

[57] ABSTRACT

A worksurface arrangement (12) includes a structural core (21) having an enlarged upper surface bounded by generally vertical edge surfaces. Upper and side surfaces of the core (21) are covered by a thin sheetlike laminate (31) which provides soft surfaces and edges. The laminate includes an outer thin layer (32) of a thermoplastic material disposed in overlying relationship to an inner layer (33) of resilient foam material. These two layers are preferably secured together, and the outer layer (32) has a thickness which is a small fraction of the thickness of the underlying resilient foam layer (33), which latter layer is itself relatively thin.

13 Claims, 1 Drawing Sheet

RESILIENT MONOLITHIC WORKSURFACE

This is a continuation of application No. PCT/US91/04383, filed Jun. 19, 1991, which in turn is a continuation of U.S. Ser. No. 07/540 156, filed Jun. 19, 1990, now abandoned.

FIELD OF THE INVENTION

This invention relates to a worksurface arrangement such as used for a desk or the like, and in particular to an improved worksurface arrangement having improved physical properties, specifically limited resiliency, so as to be more user friendly.

BACKGROUND OF THE INVENTION

Worksurface (i.e. worktop) arrangements are extensively utilized, particularly in the office environment. Such worksurface arrangements are utilized in many forms and configurations, and in many office environments are supported on and project outwardly in a cantilevered manner from an upright space divider panel. In other usages the worksurface arrangement functions as the top of a freestanding table or desk.

The worksurface arrangement is conventionally constructed utilizing a structural core, often of particle board, having a hard plastic sheet adhesively secured to upper and vertical edge surfaces thereof. Such worksurface arrangements, while providing a hard and durable working surface, are nevertheless considered "unfriendly" to the user since they are extremely hard to the touch and can cause significant discomfort when the user rests bony protrusions such as an elbow or wrist thereon or accidentally impacts thereagainst. Further, these worksurface arrangements often have sharp corners or edges where the top and side surfaces join, and these corners are uncomfortable and, in fact, can be painful to the user under circumstances involving accidental impact and/or long-term contact with such surfaces, edges and corners.

In an attempt to improve the propeties of the worksurface arrangement, it is conventional to secure an edge strip around the core, which edge strip conventionally comprises an extruded element having limited resiliency. This edge strip is normally provided with a securing flange (such as a Christmas-tree type securing flange) which is inserted into an elongate groove formed in and extending around the peripheral edge of the core. While this provides a durable and somewhat resilient front edge and corner to the worksurface arrangement, nevertheless the use of this edge strip increases the manufacturing complexities and costs. Further, the edge strip often projects either slightly above or below the top surface of the worksurface and either interferes with use of the top surface or provides an unsightly appearance. Hence, even though these edge strips have been used for many years, they nevertheless do possess many well recognized disadvantages.

Accordingly, it is an object of the present invention to provide an improved worksurface arrangement which is more "user friendly", namely a worksurface arrangement having a soft and resilient surface so as to overcome the disadvantages associated with known worksurface arrangement.

According to the present invention, the "user friendly" worksurface arrangement has a resilient monolithic cover or shell which totally covers both the upper surface and all of the vertical edge surfaces so as to provide softness and resiliency for the upper and edge surfaces and also for the corners and edges, thereby providing improved user comfort when using the worksurface arrangement, while at the same time providing an upper working surface having enhanced properties or characteristics such as when used for writing.

Another desirable feature of the resilient monolithic cover is that it is flexible. This flexibility allows for worksurfaces that can articulate or bend positively or negatively along a given line or lines without introducing cracks or gaps in the surface and thus provide improved ergonomics by means of adding adjustabilities not possible with other surface construction methods.

The resilient underlayment provides a further advantage by means of acting as a separator between the core and the surface materials. As such both the core and the surface can expand and shrink at different rates due to temperatures and/or humidity changes without affecting each other through build up of excessive internal stresses which evidences itself as warpage. The resilient underlayment absorbs the minute dimensional differences between the core and the surface material through a wide range of temperature and humidity conditions and thereby significantly reduces the problem of warpage in the "user friendly" worksurface.

In a preferred embodiment of the invention, the worksurface arrangement includes an enlarged sheet-like structural core having a horizontally enlarged upper surface bounded by generally vertical edge surfaces, which structural core may be constructed of particle board or other suitable material. The upper and side surfaces of the core are covered by a thin sheetlike laminate which provides soft surfaces and edges so as to be more comfortable to the touch and the resting and support of forearms, but which also provides desirable impact wear and chemical resistance. The laminate includes an outer thin layer of a thermoplastic material disposed in overlying relationship to an inner layer of resilient foam material. These two layers are preferably secured together, as by an adhesive, and the upper thermoplastic layer has a thickness which is a small fraction of the thickness of the underlying resilient foam layer, which latter layer is itself relatively thin. The laminate is disposed so that it totally overlies the upper surface of the core with the resilient foam layer being disposed in direct contact with the upper surface of the core. The edges of the laminate are suitably deformed so as to effectively wrap around and snugly embrace the peripheral edge surfaces of the core.

In a preferred embodiment the thin thermoplastic layer preferably has a thickness in the range of about 0.020 inch to about 0.035 inch, and the resilient foam layer has a thickness of about ⅛ inch.

Other structural and functional aspects of the invention will be apparent from the following description.

Figure 1:
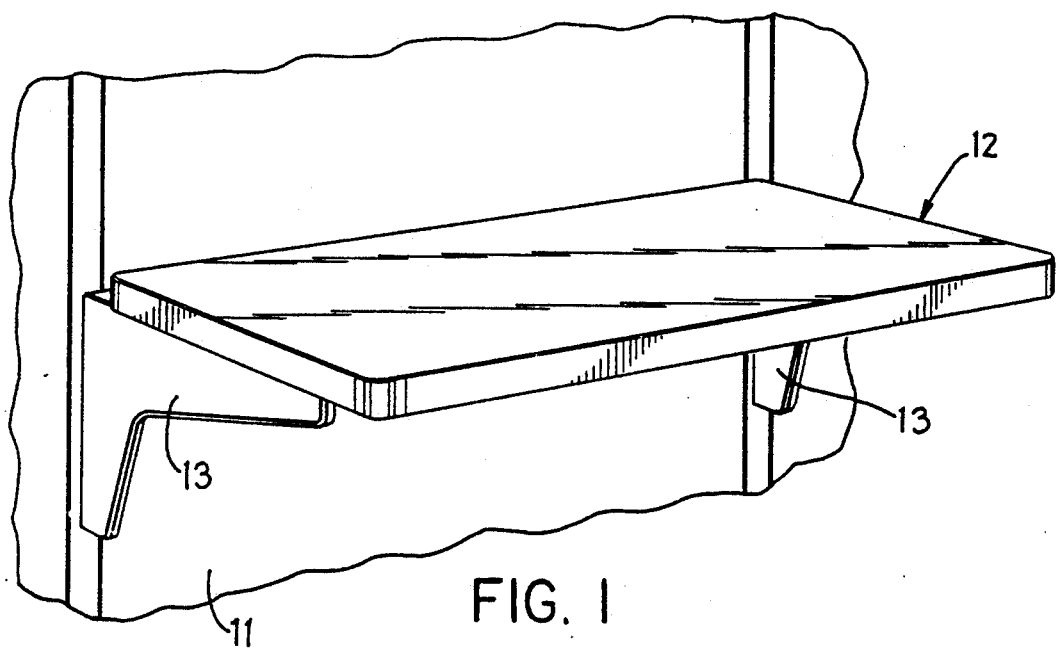
FIG. 1 illustrates a conventional arrangement wherein a horizontal worksurface is supported in a cantilevered manner on a side of an upright space divider panel.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the structure and designated parts thereof. Said terminology will include the words specifically mentioned, derivatives thereof, and words of similar import.

DETAILED DESCRIPTION

FIG. 1 illustrates an upright wall or space divider panel 11 having a generally horizontally planar worksurface or worktop structure 12 supported thereon by a pair of support arms or brackets 13 so that the worksurface structure 12 projects generally horizontally outwardly from the wall panel 11.

Figure 2:
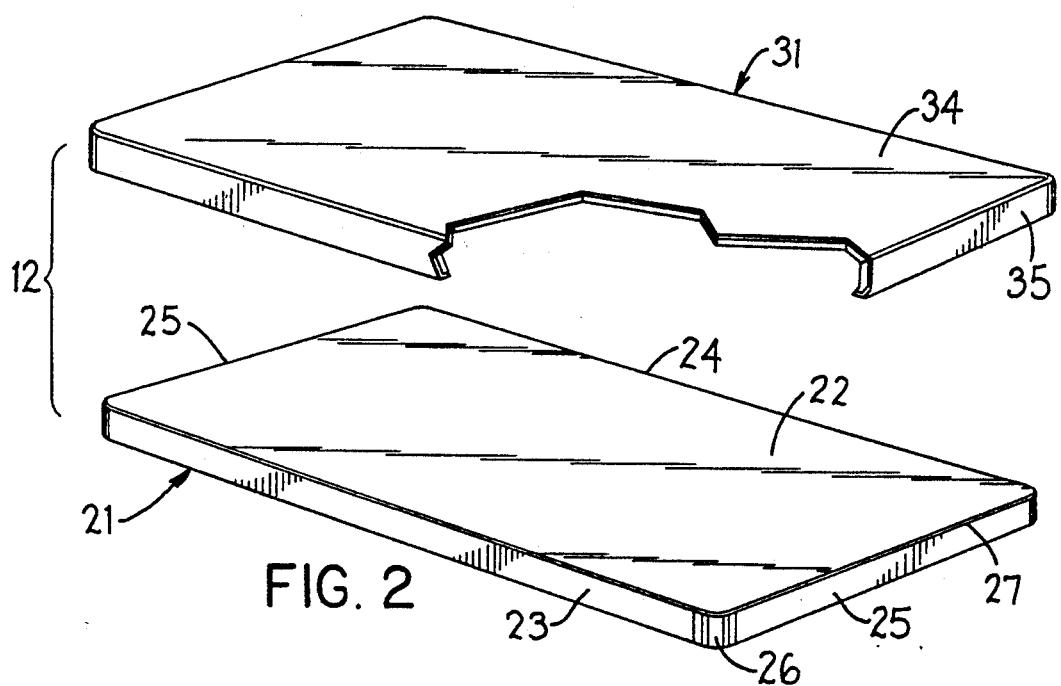
FIG. 2 illustrates the inventive worksurface wherein the covering or shell is separated from the structural core for purposes of illustration.
Figure 3:
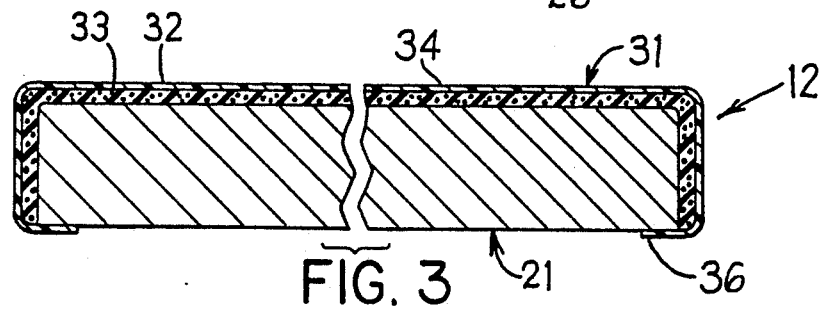
FIG. 3 is a central cross-sectional view of the worksurface structure.

The worksurface 12, as illustrated by FIG. 2, includes a sheetlike structural core 21 which is typically constructed of a hard and rigid material such as particle board, although other suitable materials can also be utilized. This structural core 21, in the illustrated embodiment has a conventional rectangular configuration in that it includes a horizontally enlarged and generally planar upper surface 22 bounded by generally front and back vertical edge or side surfaces 23 and 24, respectively, these latter surfaces in turn being joined by vertical end surfaces 25. The adjacent and generally perpendicularly extending edge surfaces are typically joined by a rounded corner such as indicated at 26. Each of the edge surfaces also preferably joins to the upper surface 22 by means of a small radius or rounded edge 27. In a typical application, the particle board core 21 has a thickness of about 1 and ⅛th inches, although other materials and thicknesses can be utilized depending upon the design and loading demands of the workpiece structure.

The worksurface structure 12 also includes a one-piece monolithic shell or covering 31 which is attached to the core 21 so as to substantially overlie and enclose the upper and edge surfaces thereof. This covering 31 is of a semi-rigid construction having limited softness and resiliency when mounted on the core 21 to hence provide a worksurface structure having properties which are believed to be more user friendly.

The shell or covering 31 is constructed substantially as a laminate defined by outer and inner (or upper and lower) layers 32 and 33, respectively, which layers are preferably suitably secured together, such as by an adhesive.

The covering 31 includes a generally planar and horizontally enlarged top wall 34 which is adapted to rests directly on and extend coextensively over the upper surface 22 of the core 21. This top wall 34 in turn is integrally joined to an endless perimeter side wall 35 which projects downwardly and has a configuration and size so as to snugly embrace the vertical edge surfaces of the core 21.

The upper or outer layer 32 of the covering is formed from a thin thermoplastic sheet, one example of which is polyester, such as Mylar (trademark of DuPont), or a polycarbonate, such as Lexan (trademark of General Electric). This thermoplastic sheet 32 is capable of being heat formed to the desired shape and contour. Further, this thermoplastic sheet is thin, preferably having a thickness in the range of from about 0.020 inch to about 0.035 inch.

The upper layer 32 is also preferably covered with a thin surface coating to improve the surface durability characteristic of the covering. This thin surface coating is typically only a few thousands inch thick and is provided so as to improve scratch resistance and wearability. The surface coating may be a polyester/acrylic blend, filled with zirconium, although other known coatings can also be utilized.

The inner or lower layer 33 of the covering is defined by a thin sheet of a rubberlike resilient material, preferably a foamed resilient material such a foam rubber (i.e. closed cell neoprene) or foam plastics (i.e. closed cell polyolefin). This layer 33, while thin, nevertheless has a thickness which is several times greater than the thickness of the thermoplastic sheet 32. In a preferred embodiment, the resilient sheet 33 preferably has a thickness of about one-eight inch, although the thickness of this resilient sheet 33 may vary within a thickness range of about 25% greater or less than this preferred thickness.

The thermoplastic sheet 32 and resilient sheet 33 are preferably fixedly secured together, as by a suitable adhesive such as contact cement, for securing the overlying surfaces of the sheets together. This laminating of the sheets 32 and 33 together preferably initially occurs when the sheets are still in generally flat and planar form. The thus formed laminate is then positioned so as to overly the upper surface 22 of the core 21, with the edges of the laminate projecting outwardly beyond the edge surfaces of the core. The edge portions of the laminate are then suitably deformed, such as by a heat forming process, so as to be bent downwardly to effectively create the endless peripheral edge wall 35, which edge wall 35 totally surrounds and substantially snugly embraces the edge surfaces 23, 24 and 25 of the core. During this deforming process, the laminate creates a generally rounded edge at the interface between the top and edge surfaces, and also creates rounded corners which are compatible with the rounded corners 26 on the core.

To ensure that the shell or covering 31 remains fixedly and rigidly secured to the core 21, various techniques can be utilized. For example, reinforced sheetlike thermoplastic corner pieces can be positioned directly under the core 21 in the regions of the corners thereof, which corner pieces can be bonded to the lower edges of the thermoplastic sheet 32. Alternatively, a suitable adhesive can be provided between the edge surfaces of the core and the opposed inner surface on the inner resilient layer 33.

In a preferred variation, however, the peripheral edge 35 of the shell 31 is preferably formed, such as during the heat forming step, so that an edge portion 36 of the sheet 32 projects slightly under the bottom surface of the core to hence effectively lock the shell 31 to the core 21. Removable staples, or a securing spline, can be used to lock the edge portion 36 to the core 21.

The "user friendly" worksurface of this invention is believed unique in that it is soft and this softness is not only on the surface but also around the edges and corners, and this softness imparts a degree of comfort to the user that is not available on hard surfaces. Bony protrusions such as elbows, forearms and wrists do not hurt when resting on the surface.

Further, the actual surface of this "user friendly" worksurface is still hard enough so that writing characteristics using pen, pencil or any writing tool and a single sheet of paper are actually enhanced over that of a harder worksurface. The softness associated with the worksurface of this invention causes the surface to slightly wrap around the point of a writing tool such that the lining width is enhanced and made more consistent.

In addition, because the resilient underlay material such as the resilient sheet 33 basically provides insulating characteristics, the exposed surface of the worksurface arrangement tends not to draw heat from a bare forearm as is typical of current constructions, and thus the user friendly worksurface of this invention provides a warmth characteristic.

Still further, by making the entire shell or covering including the upper surface and all of the edge surfaces as one monolithic structure, it is also possible to mold into the shell various details such as small trays and the like so as to permit holding small office tools and supplies within fingertip reach of the user. Such modifications can be incorporated easily and efficiently without significantly increasing cost or detracting from structure integrity and appearance.

Another advantage of the user friendly worksurface is the fact that the outer layer 32 of the shell or covering is typically clear. Color can be added to the back or underside of this sheet layer to provide a selected coloring, or in the alternative coloring can be provided only at selected areas of the layer.

With respect to the resilient layer 33, this layer must have properties so as to provide for the desired degree of softness and resiliency, and this is best achieved by avoiding use of a layer having undesirable thinness. At the same time, however, the properties and specifically the thickness of resilient layer 33 should not be such as to permit creation of "footprint impressions" in the layer. Rather, any impressions created in the worksurface should automatically disappear within a reasonably short period of time due to the natural expansion of the resilient layer to its original configuration. As an example, the material of resilient layer 33 may have a 25 percent thickness compressibility in response to compression loading in the range of from about 2 psi to about 5 psi.

Use of the resilient layer 33 also is advantageous since this permits use of a substrate or core 21 which need not have a totally smooth and finished upper surface. Rather, this resilient layer 33 acts as a barrier so as to hide and make non-noticeable surface imperfections in the substrate or core, and as a result the substrate or core can be of lower cost. While the substrate may be constructed of particle board, it is anticipated that other inexpensive materials would also be suitable for creation of the core 21, and permit still additional cost savings.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A worksurface arrangement, comprising:
a horizontally-enlarged platelike rigid core, said core having a generally planar and horizontally enlarged upper surface bounded by peripheral edge surfaces which project downwardly from edges of said upper surface and are of small vertical extent relative to the horizontal dimensions of said upper surface;
one-piece monolithic cover means for covering the upper surface and at least one edge surface of said core and providing limited resiliency and softness throughout, said cover means including a horizontally enlarged top wall which extends coextensively over the upper surface of the core and a generally downwardly projecting side wall which extends generally coextensively over said one edge surface;
said cover means being constructed as a thin laminate having outer and inner layers which extend throughout the top and side walls of the cover means;
said inner layer comprising a thin layer of resilient rubberlike material positioned so as to extend coextensively over said upper and said one edge surfaces of the core; and
said outer layer comprising a thin layer of a firm but deformable material which is engaged with and extends coextensively over the outer surface of said inner layer.

2. A worksurface arrangement according to claim 1, wherein said outer layer comprises a thermoplastic material.

3. A worksurface arrangement according to claim 2, wherein said resilient inner layer has a thickness which is several times greater than the thickness of the thermoplastic outer layer.

4. A worksurface arrangement according to claim 2, wherein said resilient inner layer has a thickness in the range of about 0.100 and about 0.150 inch.

5. A worksurface arrangement according to claim 4, wherein said thermoplastic outer layer has a thickness in the range of about 0.020 to about 0.035 inch.

6. A worksurface arrangement according to claim 2, wherein said thermoplastic outer layer has a thickness in the range of about 0.020 to about 0.035 inch.

7. A worksurface arrangement according to claim 2, wherein the resilient inner layer is of a closed cell foam rubber or foam plastic.

8. A worksurface arrangement according to claim 2, wherein the layer of foam rubber or foam plastic has about 25 percent thickness compressibility in response to compression loading in the range of from about two pounds to about five pounds per square inch.

9. A worksurface arrangement according to claim 2, wherein the thickness of the outer layer is significantly smaller than the thickness of the inner layer.

10. A worksurface arrangement according to claim 1, wherein the cover means has a surface durability coating providing coextensively over the exterior surface of said outer layer, said coating having a thickness of only a few thousandths of an inch.

11. A worksurface arrangement according to claim 1, wherein the side wall of the said cover means extends generally coextensively over all of the peripheral edge surfaces of the core for generally enclosing the core within the cover means.

12. A worksurface arrangement according to claim 1, including securing means attached to said outer layer and positioned under and attached to said core for fixedly attaching said covering means to said core.

13. A worksurface arrangement according to claim 2, wherein said arrangement is mounted on and projects generally horizontally outwardly away from an upright wall panel.

* * * * *